UNITED STATES PATENT OFFICE.

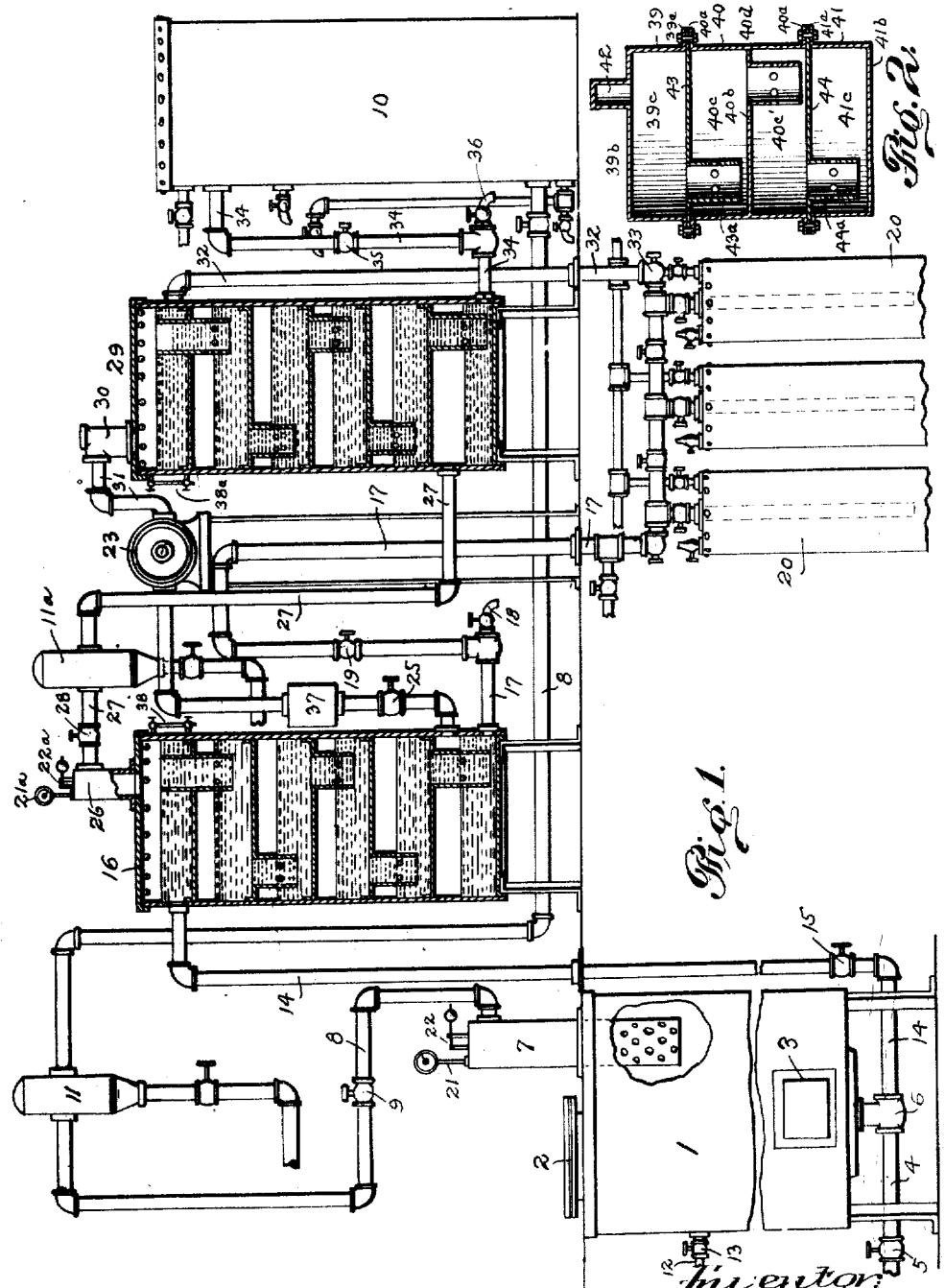

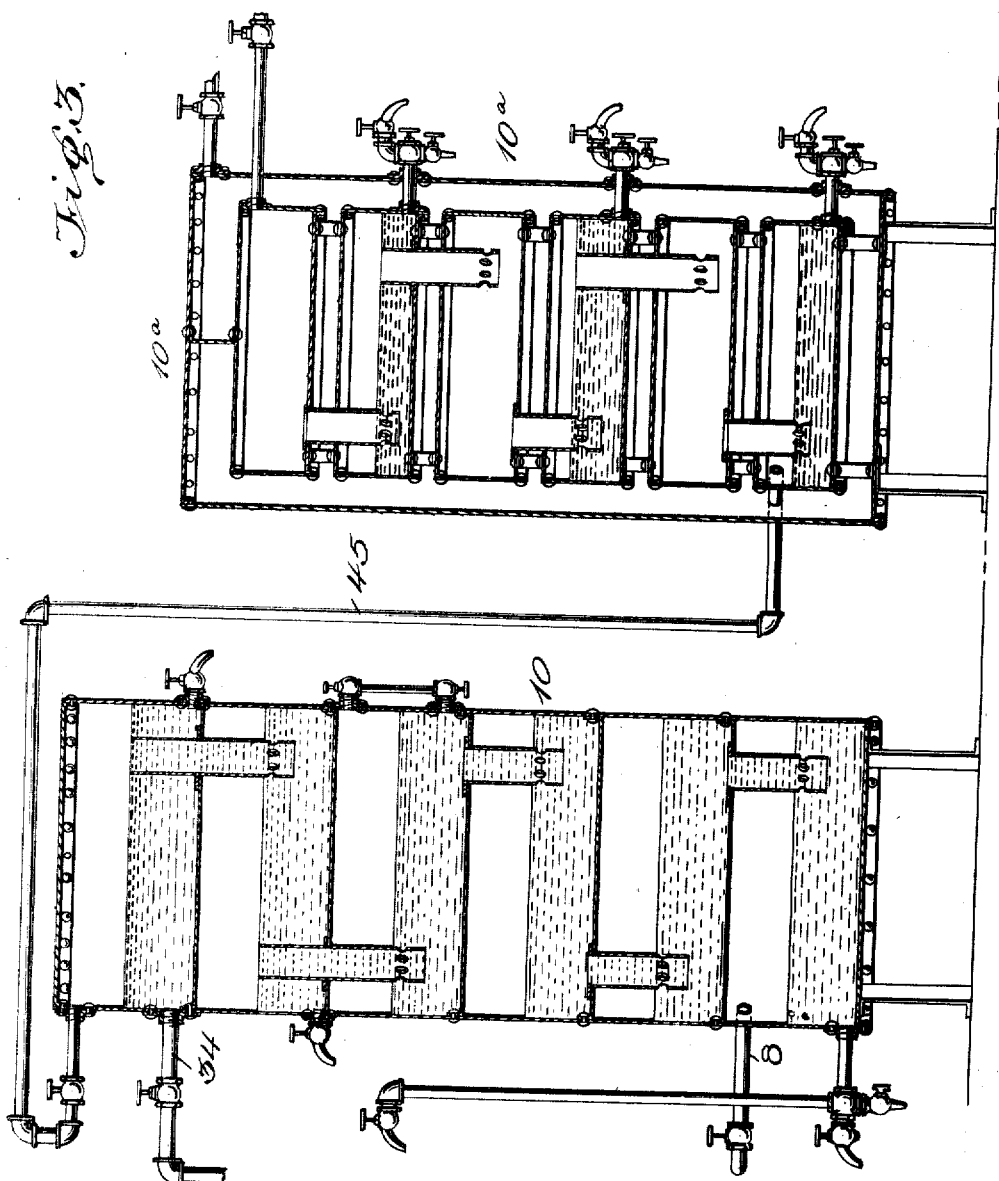

FRANK E. YOUNG, OF CANTON, OHIO.

METHOD OF AND APPARATUS FOR MANUFACTURING ALCOHOL FROM GARBAGE.

1,210,250.　　　Specification of Letters Patent.　　Patented Dec. 26, 1916.

Application filed August 9, 1915. Serial No. 44,467.

*To all whom it may concern:*

Be it known that I, FRANK E. YOUNG, a citizen of the United States, residing at Canton, in the county of Stark and State of Ohio, have invented a certain new and useful Method of and Apparatus for Manufacturing Alcohol from Garbage, of which the following is a specification.

The invention relates to the disposal of city garbage and the salvage of by-products thereof; and the objects of the invention are to reduce garbage to its elemental values without the usually attendant disagreeable features, and in a more efficient and economical and profitable manner than has heretofore been possible.

In the present invention, the garbage is thoroughly cooked by steam passed therethrough, after which it is pressed and the garbage water separated therefrom, fermented and distilled, all in an anaërobic manner. The free grease passing off with the steam from the cooking tank is mechanically separated therefrom, the steam passing on to the still and the alcohols carried thereby condensed; and the free grease in the garbage water, mixing with a current of cool air circulating therethrough, forms a foam which is separated therefrom before the garbage water is fermented. After the garbage water has been pressed from the garbage, the tankage is dried and separated, the cellulose of the vegetable matter being converted into glucose, and the glucose fermented and distilled with the garbage water; the animal portion of the tankage is mixed with the evaporated spent wash from the still, for use as feed or fertilizer; and the mineral matter separated from the tankage is practically waste.

In the accompanying drawings I have illustrated a preferred form of apparatus, by means of which my invention may be carried out, in which—

Figure 1 is a side view of a cooking tank, a cooling tank, a preheating tank, a fermenting apparatus, and the vaporizing column of a still, connected together, the cooling tank and the preheating tank being shown in section; Fig. 2, is a sectional view showing a modified form of construction for the cooling and preheating tanks; and Fig. 3 is a sectional view of the vaporizing and condensing column of the still.

Similar numerals refer to similar parts throughout the drawings.

The cooking tank 1 is normally closed from communication with the atmosphere and is provided with a garbage inlet 2 in its top wall, having a removable cover through which green garbage is admitted from a suitable source of supply; and a tankage outlet 3 in its lower end, having a removable door. Steam entering the bottom of the tank 1 through a steam pipe 4 controlled by a suitable valve 5, passes through a fitting 6 into the tank and through the garbage therein, and escapes from a dome 7 in the upper end of the tank through a steam pipe 8 controlled by a valve 9, to the vaporizing column 10 of the still.

The grease or oil which is carried in suspension in the steam after passing through the cooking tank, is separated therefrom and the other volatile bodies carried thereby, by means of a grease separator 11, of well known construction, and discharged into a suitable grease reservoir (not shown), said separator preferably being of the type in which baffle plates are arranged within a casing to collect oil or grease from the steam passing therethrough.

When the garbage has been thoroughly cooked, the valves 5 and 9 in the steam pipes are closed, and air under a pressure preferably of from one hundred to one hundred fifty pounds, admitted into the tank through an air pipe 12 near the upper end thereof, which is controlled by a suitable valve 13, compresses the cooked garbage and forces the heated garbage water from the tank through the fitting 6 and a pipe 14, controlled by a valve 15, into the cooling tank 16.

From the cooling tank the garbage water is conducted by means of a pipe 17, having a drain spigot 18 and a controlling valve 19 therein, to the fermenting apparatus 20, which is preferably of the type shown in my copending application, Serial No. 826,482, and the garbage water or mash converted into wort; the excess acid in the garbage water being neutralized by adding lime or other alkali, before yeasting. Preferably the dome 7 of the cooking tank is provided with a pressure gage 21 and safety valve 22.

By the use of compressed air, as distinguished from steam, which is commonly used, not only is the pressing of the garbage for separating the water therefrom accomplished in a more economical manner, but the danger attending a high steam pressure is greatly diminished, and the facility with which the cooking tank may be recharged increased, the air serving to cool the tank after the cooking operation.

The garbage water passing through the cooling tank 16, which is preferably constructed in substantially the same manner as the vaporizing column of the still illustrated in my copending application, Serial No. 826,483, with a plurality of chambers therein communicating with each other by means of depending tubes, is thoroughly mixed with a current of cool air which is circulated therethrough by means of a suitable pump 23, the air entering the bottom of the tank by means of a pipe 24 controlled by a valve 25, the air escaping from a dome 26 in the top of the tank through a pipe 27, which is controlled by a valve 28, into the lower end of a wort preheating tank 29; the dome 26 being provided with a pressure gage 21ª and safety valve 22ª. As the heated air escapes from the cooling tank, the grease or oil carried thereby is separated therefrom by means of a grease separator 11ª and discharges into a suitable grease reservoir (not shown).

The heated air entering the bottom of the preheating tank 29, which is preferably of the same construction as the cooling tank 16, is drawn upward therein through the cold wort which is passing therethrough on its way from the fermenting tank to the still, out through the dome 30 and pipe 31 into the pump 23, and again circulated through the tanks; the wort from the fermenting tank being admitted into the upper end of the preheating tank through a pipe 32 controlled by a valve 33, and discharged by gravity through a pipe 34 controlled by a valve 35, and having a drain spigot 36 therein, into the still for distillation. If desired, a cooling coil 37 may be inserted in the cold air line between the pump and the cooling tank.

It will thus be seen that by providing a closed circuit for the air passing through the cooling and preheating tanks, not only is the air kept in a strictly sterile condition, but the heat imparted thereto by the heated garbage water is imparted to the cold wort on its way to the still, and upon leaving the preheating tank is in condition for again cooling the garbage water before it is discharged into the fermenting tanks; the operation being automatic.

By the construction of the cooling and preheating tanks illustrated, the ascending air comes into contact with all parts of the descending liquid, the retardation of the vapor in its upward course through the several chambers being of sufficient length of time to permit the interchange of heat for thoroughly cooling and heating the liquids in the respective tanks. The liquids in the tanks being discharged by gravity, the rate of flow through the pipes 17 and 34 into the fermenting tank and still respectively, is determined by the head of the liquid in the cooling and preheating tanks above the upper ends of the pipes, which is varied by increasing or decreasing the height of said pipes.

The cooling tank and preheating tank are each preferably provided with a sight glass 38 and 38ª near their upper ends to indicate the height of the liquid therein.

In Fig. 2, I have illustrated a modified form of construction for the cooling and preheating tanks, in which the tank is formed or cast in a plurality of sections 39, 40 and 41 having rim flanges 39ª, 40ª and 41ª thereon by means of which they are bolted together, the intermediate section 40, of which one or more may be employed, being open at each end and having a partition 40ᵇ formed integral therewith between its ends. The upper end of the section 39 has a closed end wall 39ᵇ and a dome 42 formed integral therewith, and the lower end of the section 41 is closed by an end wall 41ᵇ; partitions 43 and 44 being provided between the flanges of the adjacent sections to form chambers 39ᶜ, 40ᶜ and 40ᶜ' and 41ᶜ communicating with each other by means of the tubes 43ª, 40ᵈ and 44ª formed integral with the several partitions.

The steam carries with it from the tank 1 through the pipe 8, into the vaporizing column 10 of the still, certain of the volatile bodies from the garbage; to which are added the volatile bodies in the wort which is delivered from the preheating tank 29 through the pipe 34 into the vaporizing column 10 of the still; after which all the volatile bodies thus combined, pass through the pipe 45 into the condensing column 10ª of the still, wherein the alcohol and other volatile bodies are condensed in the manner set forth in said co-pending application, Serial No. 826,483.

The tankage remaining in the cooking tank 1 after the separation of the garbage water therefrom, is removed, dried, milled and separated; the drying preferably being accomplished by a direct drier and the separating by the use of a separating screen and air blast, the dried tankage being separated into four parts, viz: coarse material, such as bones, metals, tins, rags, etc.; mineral substances such as sand, gravel, broken glass, crockery, etc., which is practically waste; animal matter, such as broken bone and meat products; and vegetable matter, such as dry fruit, vegetable and grain products.

The waste matter in the coarse material is readily separated out, and the values recovered; the animal matter is mixed with evaporated spent wash from the still for use as feed or fertilizer; and the vegetable matter converted into glucose. Glucose or any other saccharine matter, as for instance, molasses, is then added to the garbage water in order to support fermentation, the enzyms formed by the fermentation of the saccharine matter acting to convert the limited amount of starch in the garbage water into sugar; it being a well known fact that before fermentation the starch must be converted into sugar, which is usually accomplished by the use of malt. However, this use of malt is rendered unnecessary for the reason that when the fermentation of a mixed mash takes place in an anaërobic manner, as in the present invention the adverse germs of fermentation are excluded, and the enzyms formed by the fermentation of the saccharine matter are thus permitted to continue to act without opposition.

It will be evident that alcohol is thus obtained from the garbage from three different sources or stages of the reduction, viz: by the condensation of the steam from the cooking tank, which contains alcohol formed by the spontaneous fermentation of the garbage before reduction; by fermenting and distilling the garbage water; and by converting the starch and cellulose of the vegetable matter which has been separated from the tankage, into glucose, and fermenting and distilling the same.

When the tankage has been removed from the cooking tank, the tank may be immediately recharged, the valves 5 and 9 opened, the garbage cooked, and the various steps in the process carried out, as above set forth. When it is desired to make the operation continuous, several cooking tanks should be employed in order to provide a continuous supply of garbage water to the fermenting apparatus, and a continuous supply of steam to the still. Otherwise, it is necessary to provide a source of supply of steam for the still direct from the boiler, for the reason that during the recharging of the cooking tank, the flow of steam to the still is necessarily discontinued.

I claim:

1. The method of manufacturing alcohol from garbage, consisting in cooking the garbage in a closed tank by forcing steam therethrough, separating the grease from the steam, and condensing the alcohol carried by the steam.

2. The method of manufacturing alcohol from garbage, consisting in cooking the garbage by forcing steam therethrough and pressing the garbage water therefrom, fermenting the garbage water or mash, and distilling the wort.

3. The method of manufacturing alcohol from garbage, consisting in cooking the garbage and pressing the garbage water therefrom, mechanically separating the grease from the garbage water, fermenting the garbage water or mash, and distilling the wort.

4. The method of manufacturing alcohol from garbage, consisting in cooking the garbage and pressing the water therefrom, drying the tankage, separating the vegetable matter from the tankage, converting the vegetable matter into glucose, fermenting the glucose, and distilling off the alcohol.

5. The method of manufacturing alcohol from garbage, consisting in cooking the garbage in a closed tank by forcing steam therethrough, separating the grease from the steam and condensing the alcohols carried by the steam; in pressing the garbage water from the cooked garbage or tankage, separating the grease from the garbage water, fermenting the garbage water or mash, and distilling the wort; and in drying the tankage, separating the vegetable matter from the tankage, converting the vegetable matter into glucose, fermenting the glucose with the wort, and distilling off the alcohol.

6. The method of manufacturing alcohol from garbage, consisting in cooking the garbage in a closed tank by forcing steam therethrough, separating the grease from the steam and condensing the alcohols carried by the steam; in pressing the garbage water from the cooked garbage or tankage, separating the grease from the garbage water, fermenting the garbage water or mash, and distilling the wort by the steam from the cooking tank; and in drying the tankage, separating the vegetable matter from the tankage, converting the vegetable matter into glucose, and fermenting and distilling the glucose with the garbage water.

7. The method of manufacturing alcohol from garbage consisting in cooking the garbage in a closed tank by forcing steam therethrough, separating the grease from the steam and condensing the alcohols carried by the steam; in compressing the garbage water from the cooked garbage or tankage, separating the grease from the garbage water, neutralizing the excess acids in the garbage water, fermenting the garbage water or mash, and distilling the wort by the steam from the cooking tank; and in drying the tankage, separating the vegetable matter from the tankage, converting the vegetable matter into glucose, neutralizing the excess acids in the glucose, and fermenting and distilling the glucose with the garbage water.

8. The method of manufacturing alcohol from garbage including the steps of cooking the garbage by forcing steam therethrough, pressing the garbage water from the cooked garbage, fermenting the garbage water, and condensing the alcohols carried by the steam together with the alcohols in the fermented garbage water or wort.

9. The method of manufacturing alcohol from garbage, consisting in cooking the garbage in a closed tank by forcing steam therethrough, separating the grease from the steam and condensing the alcohols carried by the steam; and in pressing the garbage water from the cooked garbage or tankage, separating the grease from the garbage water, fermenting the garbage water or mash, and distilling the wort.

10. The method of manufacturing alcohol from garbage, consisting in cooking the garbage in a closed tank by forcing steam therethrough, separating the grease from the steam, and condensing the alcohols carried by the steam; in pressing the garbage water from the cooked garbage or tankage; and in drying the tankage, separating the vegetable matter from the tankage, converting the vegetable matter into glucose, fermenting the glucose, and distilling off the alcohol.

11. The method of manufacturing alcohol from garbage, consisting in cooking the garbage and pressing the garbage water therefrom, circulating a current of air through the garbage water to cool it, separating the grease from the current of air, fermenting the garbage water or mash, and distilling the wort.

12. The method of manufacturing alcohol from garbage, consisting in cooking the garbage and pressing the garbage water therefrom into a cooling tank, circulating a current of air through the garbage water in the tank to cool it and through a separator to separate the grease therefrom, conducting the garbage water into a fermenting apparatus to be converted into wort, conducting the wort through a preheating tank and circulating a current of heated air through the wort in the preheating tank to heat it, and conducting the wort to a still to be distilled.

13. The anaërobic method of manufacturing alcohol from garbage, consisting in cooking the garbage in a closed tank, and pressing the garbage water therefrom; and in cooling, fermenting and distilling the garbage water.

14. The anaërobic method of manufacturing alcohol from garbage, consisting in cooking the garbage by forcing steam therethrough, and condensing the alcohols carried thereby; and in pressing the garbage water from the garbage, and cooling, fermenting and distilling the garbage water.

15. The method of manufacturing alcohol from garbage, consisting in cooking the garbage in a closed tank, pressing the garbage water from the garbage by means of compressed air, and in cooling, fermenting and distilling the garbage water.

16. The method of manufacturing alcohol from garbage consisting in cooking the garbage and pressing the garbage water therefrom, conducting the garbage water from the cooking tank through a cooling tank into a fermenting apparatus to be converted into wort, conducting the wort from the fermenting apparatus through a preheating tank into a still to be distilled, and circulating a current of air through the heated garbage water on its way to the fermenting apparatus to cool it, and through the cold wort on its way to the still to heat it.

17. An apparatus for the manufacture of alcohol from garbage, including a cooking tank, cooling tank, fermenting apparatus, preheating tank, and still, connected together in series; and means for pressing the water from the garbage in the cooking tank, said cooling tank discharging into the fermenting apparatus, the fermenting apparatus into the preheating tank, and the preheating tank into the still.

18. An apparatus for the manufacture of alcohol from garbage, including one or more cooking tanks, a cooling tank, fermenting apparatus, and still, connected together; and means for pressing the garbage water from the cooked garbage into the cooling tank, said cooling tank discharging into the fermenting apparatus, and the fermenting apparatus into the still.

19. An apparatus for the manufacture of alcohol from garbage including a cooking tank, cooling tank, fermenting tank, and still connected together, means for pressing the garbage water from the cooking tank into the cooling tank, and means for separating the grease from the garbage water on its way to the fermenting tank and still.

20. An apparatus for the manufacture of alcohol from garbage including a cooking tank having a steam inlet and outlet, a still, and a steamway leading from the outlet of the cooking tank to the still.

21. An apparatus for the manufacture of alcohol from garbage including a cooking tank, having a steam inlet and outlet, a still, a steamway leading from the outlet of the tank to the still, and a grease separator in said steamway for separating the grease from the steam on its way to the still for distillation.

22. An apparatus for the manufacture of alcohol from garbage, including a cooking tank, cooling tank, fermenting apparatus, preheating tank and still connected together in series, means for pressing the water in the cooked garbage from the cooking tank and forcing it into the cooling tank, said cooling tank discharging into the fermenting tank, the fermenting tank into the preheating tank, and the preheating tank into the still, and means for circulating a current of air through the cooling tank and preheating tank to cool and heat the liquids in the respective tanks.

23. An apparatus for the manufacture of alcohol from garbage, including a cooking tank, cooling tank, fermenting apparatus, preheating tank and still connected together in series, means for pressing the water in the garbage from the cooking tank and forcing it into the cooling tank, said cooling tank discharging into the fermenting tank, the fermenting tank into the preheating tank, and the preheating tank into the still, means for circulating a current of air through the cooling tank and preheating tank to cool and heat the liquids in the respective tanks, and means for separating the grease from the current of air.

FRANK E. YOUNG.

Witnesses:
LOUISE M. CORBY,
EARL C. CARLSON.